Sept. 12, 1967     C. O. LETENDRE     3,341,348
RELEASE SURFACES AND PROCESSES
Filed Dec. 11, 1963
Step 1
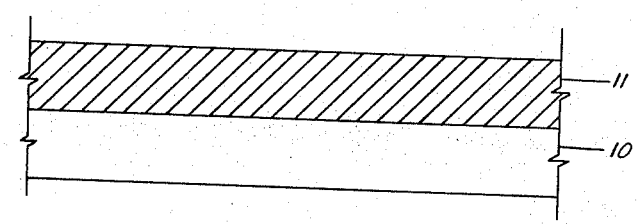
Step 2
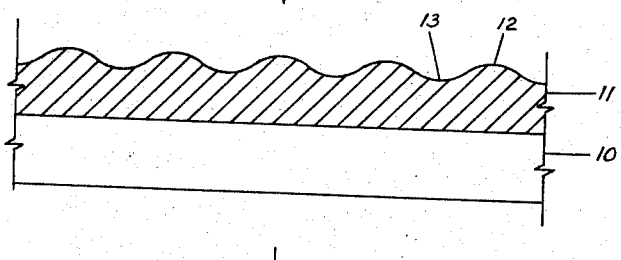
Step 3
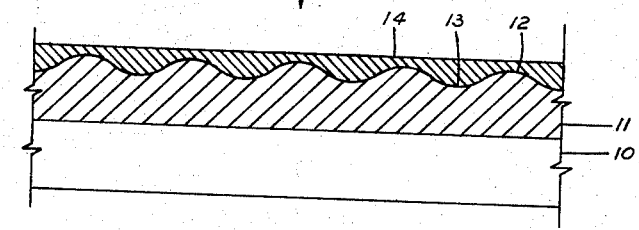
Step 4
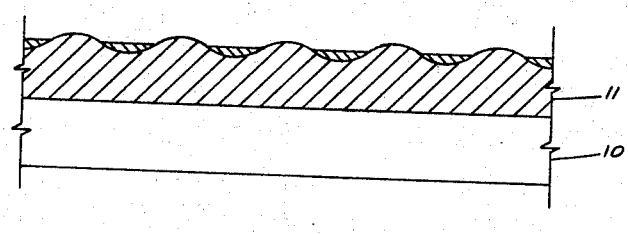
INVENTOR.
CALVIN O. LETENDRE … # 3,341,348
RELEASE SURFACES AND PROCESSES
Calvin O. Letendre, Northford, Conn., assignor to Chromium Corporation of America, Waterbury, Conn., a corporation of Delaware
Filed Dec. 11, 1963, Ser. No. 329,882
15 Claims. (Cl. 117—8)

The present invention is directed to novel abrasion-resistant release surfaces and to the process of manufacturing said novel surfaces.

In many areas of use, it is desirable to employ a device having a surface which has a low tendency to adhere to other materials. Rolls used for shaping, forming, and guiding various materials are used in many industrial operations. Many of these operations require that there should be minimal adhesion of the treated material to the surface of the roll. Typically, this may be accomplished by using rolls having good surface release properties. Such rolls are utilized in the processing of materials including paper, cloth, rubber, sheet plastics, fibers, etc. Fluorinated hydrocarbon polymers in solid form may have good release properties. However, there may be sufficient adherence of the material treated to such rolls so that with continuous use the surface loses its good release properties.

The rolls may require either intermittent or continuous treatment to remove material accumulated on the surface thereof and thereby restore the release properties of the surface. It would be especially desirable to continuously remove adhering material from the surface of the roll. Heretofore, no practical and satisfactory method for preventing build-up on fluorocarbon polymer surfaces is known. Physical removal of build-up, e.g. with a doctor blade, has suffered from the disadvantage that the surface is severely abraded and the desirable smooth surface (with its attendant good release properties) is destroyed.

It is an object of this invention to provide abrasion-resistant surfaces having superior release properties. It is a further object of this invention to provide release rolls which may be operated in such a manner that the surface retains its release properties over long periods of operation. It is still another object of the present invention to provide a process for manufacturing said novel release rolls.

In accordance with certain of its aspects, this invention relates to the process for forming, on a substrate, a novel surface having superior release and abrasion properties which comprises the steps of forming, on said substrate, a textured chromium surface having a plurality of substantially uniformly distributed depressions and peaks; applying to said textured surface a thin uniform deposit of fluorocarbon polymer; heating said textured surface to a temperature above the fusion temperature of said fluorocarbon polymer thereby forming a continuous film of fluorocarbon polymer on said textured surface; and removing said film from said peaks thereby forming a release surface consisting of discrete islands of chromium substantially uniformly distributed throughout a continuous film of fluorocarbon polymer, said chromium constituting 0.01% to 30% of the area of said release surface.

In the practice of this invention, it may be desirable to form, on a substrate, a textured surface of chromium. Preferably, the substrate may be a roll. The roll on which the chromium surface is formed may be metal, typically iron or steel. The textured chromium surface may be formed thereon by chromium-plating the metal roll, either directly or over a copper-nickel undercoat, and texturing the so-formed surface, as by blasting, knurling, etc. Alternatively, the metal roll may be textured prior to chromium plating to form the textured chromium surface. In either case, chromium may be plated on the metal roll to a thickness of about 0.01–0.5 millimeter in accordance with standard techniques for plating hard chromium.

Preferably, the chromium may be plated prior to the texturing operation and preferably texturing may be accomplished by blasting the plated surface with an abrasive. Blasting may be accomplished by use of an air stream, a centrifugal impeller, or the like. The abrasive may typically be a fine grit, preferably about 60–80 grit, abrasive. Preferably, the abrasive may be aluminum oxide, emery, carborundum, etc. The blasted or otherwise textured chromium surface may have a substantially uniform distribution of peaks and depressions, wherein the peaks may be about 0.002–0.15 millimeter higher than the depressions. If desired, the surface may be polished, thereby flattening the peaks somewhat to plateaus to produce an open grain type finish.

Prior to the application of the fluorocarbon polymer, the chromium plated roll may preferably be cleaned and degassed. Cleaning may be done by a spray, wipe, or similar technique with a suitable solvent, preferably water, followed by a degreasing solvent such as trichloroethylene, benzene, naphtha, etc. The plated roll may then be degassed to drive off contained hydrogen, typically by heating the roll for about one hour and preferably six hours at about 90–95° C. After cooling, the surface may preferably be cleaned with a degreasing solvent.

After texturing, degassing and cleaning, the roll surface may be coated with a fluorocarbon polymer, i.e. a polymer which is predominantly composed of fluorine and carbon and containing, at the most, only small quantities of other elements, e.g. hydrogen, chlorine, etc. Examples of preferred fluorocarbon polymers are tetrafluoroethylene and hexafluoropropylene polymers, tetrafluoroethylene-hexafluoropropylene copolymers, monochlorotrifluoroethylene polymers, etc. Preferred fluorocarbon polymers are those which flow together or fuse at a temperature of about 175–400° C., preferably 285–345° C. Copolymers of tetrafluoroethylene and hexafluoropropylene are highly preferred because of their outstanding melt, flow, and release characteristics.

Preferably, a thin deposit of the fluorocarbon polymer may be applied to the textured surface. The thin deposit may be sufficient to produce a final film thickness of about 0.05–0.15 millimeter, the greatest film thickness being found over the depressions of the textured surface. This may correspond to an application of about 0.15–3 grams of fluorocarbon polymer per square decimeter of roll surface.

The desirably thin deposits may be obtained by spraying, wiping or dusting the fluorocarbon polymer over the textured surface of the roll. The roll may also be heated and dipped or immersed in a fluidized bed of the fluorocarbon polymer. Electrostatic spray techniques, wherein the roll is placed at ground potential and particles of powdered fluorocarbon polymer charged at 90,000 volts or greater are sprayed thereon, are highly useful. If desired, fluorocarbon polymer may be applied to the textured surface by hot platens under pressure. Spraying, including electrostatic spraying may be highly preferred.

The fluorocarbon polymer may preferably be applied in a finely divided form, e.g. as a fine powder, a liquid dispersion, etc. having a particle size of the order of about 1–100 millimicrons, preferably 1–20 millimicrons. A liquid dispersion of fluorocarbon polymer may be employed, typically an aqueous dispersion containing about 40%–60% typically 50% by weight fluorocarbon polymer; about 0.5% wetting agent, typically an alkylaryl sulfonate such as dodecylbenzyl sulfonate, and 0.1% preservative, typically sodium benzoate. Such liquid dispersions may be sprayed onto the textured surface with a suitable spraying apparatus. Preferably, when the fluorocarbon polymer is applied as a dispersion, the liquid dispersant will be removed, e.g. by air-drying before further treatment.

Following application of the thin deposit of fluorocarbon polymer, the roll may typically have a chalky, white appearance due to the presence of individual particles of polymer. The polymer may be fused to form a continuous film by heating the surface of the roll to a temperature of about 25–60° C. higher than the flow or fusion temperature of the polymer, e.g. to about 200–425° C. and preferably 315–345° C. This temperature is maintained until the surface appears smooth, glazed and continuous, typically about 10–15 minutes.

In order to form the novel, abrasion-resistant release surface of this invention, it may be necessary to remove a portion of the fluorocarbon polymer, thereby exposing the peaks of the textured chromium surface. Removal of the excess fluorocarbon polymer may be accomplished by belting, grinding, abrading, shaving, etc. Preferably the surface may be ground with a honing machine using fine abrasive grit set in grinding stones. Preferably, a lubricant may be employed during the grinding operation.

The novel product prepared in accordance with this invention may comprise a substrate having thereon a composite release surface containing discrete islands of chromium substantially uniformly distributed throughout a continuous film of fluorocarbon polymer, said chromium constituting 0.01–30% of the area of said composite release surface.

The process of this invention may also be depicted in the figure. Step 1 is a plan view of a portion of an element comprising a substrate 10 bearing a chromium surface 11. Step 2 depicts the element after the chromium surface 11 has been textured to obtain peaks 12 and depressions 13 substantially uniformly distributed. Step 3 depicts the element after application of a fluorocarbon polymer 14 and heating to form a continuous film of the polymer. Step 4 depicts the element after the film of polymer has been removed from the peaks of the textured chromium surface thereby forming a release surface consisting of discrete islands of chromium substantially uniformly distributed throughout a continuous film of fluorocarbon polymer, the islands of chromium constituting 0.01% to 30% of the area of the release surface.

Practice of this invention may be observed from the following illustrative example.

A steel roll was cleaned and chromium plated by a standard plating technique until a uniform plate thickness of 0.07–0.1 millimeter was obtained. The plated surface was then belted lightly with an abrasive belt to ensure evenness. The surface was uniformly blasted progressively while rotating for 30 minutes with aluminum oxide (No. 60 grit) using a compressed air blasting apparatus to produce a textured chromium surface having uniformly distributed peaks and valleys. The roll was cleaned and degreased, and degassed by heating it to 100° C. for 6 hours.

After thorough cleaning with trichloroethylene, the roll was placed at ground potential and finely powdered tetrafluoroethylene-hexafluoropropylene copolymer sold under the trademark Teflon FEP, charged at a positive potential of 90,000 volts, was sprayed evenly over the surface by means of a Sames Stajet electrostatic spray gun. The total amount of fluorocarbon polymer applied was about 60 grams, corresponding to an application of 0.15 gram per square decimeter.

The coated roll was then heated to 315° C. and held at this temperature for ten minutes, thereby fusing the fluorocarbon polymer to a smooth, continuous film. The fluorocarbon polymer was removed from the peaks of chromium by grinding lightly with a belt having aluminum oxide (No. 320 grit) set in the belt to give a novel composite release surface having about 3% exposed chromium and 97% fluorocarbon polymer. The treated roll was found to possess highly satisfactory release properties. In addition, continuous cleaning with a doctor blade could be employed during use of the roll without damage to the release surface.

Although this invention has been described by means of specific materials and embodiments, modifications thereof which clearly fall within the scope of the invention will become apparent to those skilled in the art upon reading the foregoing disclosure.

I claim:

1. The process for forming, on a substrate, a novel surface having superior release and abrasion properties which comprises the steps of forming on said substrate a uniformly textured chromium surface having a plurality of substantially uniformly distributed depressions and peaks; applying to said textured surface a thin uniform deposit of fluorocarbon polymer; heating said textured surface to a temperature above the fusion temperature of said fluorocarbon polymer thereby forming a continuous film of fluorocarbon polymer on said textured surface; and removing said film from said peaks; thereby forming a release surface containing discrete islands of chromium substantially uniformly distributed throughout a continuous film of fluorocarbon polymer, said chromium constituting 0.01–30% of the area of said release surface.

2. The process for forming a novel surface as claimed in claim 1 wherein said substrate is a metal roll.

3. The process for forming a novel surface as claimed in claim 1 wherein said uniformly textured chromium surface is formed by plating said substrate with 0.01–0.5 millimeter of chromium, and blasting the chromium plated surface with abrasive grit.

4. The process for forming a novel surface as claimed in claim 1 wherein said peaks of said uniformly textured chromium surface are .002–0.15 millimeter higher than said depressions.

5. The process for forming a novel surface as claimed in claim 1 wherein said thin deposit of fluorocarbon polymer is applied by spraying finely divided fluorocarbon polymer.

6. The process for forming a novel surface as claimed in claim 1 wherein said textured surface is heated to a temperature of 25–60° C. higher than the fusion temperature of the fluorocarbon polymer.

7. The process for forming a novel surface as claimed in claim 1 wherein said fluorocarbon polymer is selected from the group consisting of polymers of tetrafluoroethylene, hexafluoropropylene, monochlorotrifluoroethylene, and tetrafluoroethylene-hexafluoropropylene.

8. The process for forming a novel surface as claimed in claim 1 wherein said continuous film of fluorocarbon polymer has a thickness of 0.05–0.15 millimeter.

9. The process for forming on a substrate a novel surface having superior release and abrasion properties which comprises the steps of forming on said substrate a chromium plate having a thickness of 0.01–0.5 millimeter; blasting said chromium plate with abrasive grit thereby forming a uniformly textured chromium surface having a plurality of substantially uniformly distributed depressions and peaks, said peaks being 0.002–0.15 millimeter higher than said depressions; spraying onto said textured surface, at a rate of 0.15–3 grams per square decimeter, a finely divided fluorocarbon polymer selected from the group consisting of polymers of tetrafluoroethylene, hexafluoropropylene, monochlorotrifluoroethylene, and tetrafluoroethylene hexafluoropropylene thereby forming on said textured surface a thin, uniform deposit of fluorocarbon polymer; heating said textured surface to a temperature of 175–400° C. and higher than the fusion temperature of said fluorocarbon polymer, thereby forming a continuous film of fluorocarbon polymer having a thickness of 0.05–0.15 millimeter on said textured surface; and removing said film from said peaks thereby forming a release surface consisting of discrete islands of chromium substantially uniformly distributed throughout a continuous film of fluorocarbon polymer, said chromium constituting 0.01–30% of the area of said release surface.

10. The process for forming a novel surface as claimed in claim 9 wherein said substrate is a metal roll.

11. A novel article comprising a substrate having thereon a composite release surface containing discrete islands of chromium substantially uniformly distributed throughout a continuous film of fluorocarbon polymer, said chromium constituting 0.01–30% of the area of said composite release surface.

12. A novel article having a composite release surface comprising a substrate; a uniformly textured chromium surface having a plurality of substantially uniformly distributed depressions and peaks on said substrate; and a continuous film of fluorocarbon polymer on at least a portion of said textured chromium surface, the peaks of said textured chromium surface being exposed and constituting 0.01–30% of the area of said composite release surface.

13. A novel article as claimed in claim 12 wherein the fluorocarbon polymer is selected from the group consisting of polymers of tetrafluoroethylene, hexafluoropropylene, monochlorotrifluoroethylene, and tetrafluoroethylene-hexafluoropropylene.

14. The process for forming a novel surface as claimed in claim 1 wherein the peaks of said discrete islands of chromium are polished thereby flattening said peaks to plateaus.

15. A novel article having a composite release surface comprising a substrate; a uniformly textured chromium surface having a plurality of substantially uniformly distributed depressions and plateaus on said substrate; and a continuous film of fluorocarbon polymer on at least a portion of said textured chromium surface, the plateaus of said textured chromium surface being exposed and constituting 0.01–30% of the area of said composite release surface.

References Cited

UNITED STATES PATENTS

| | | | |
|---|---|---|---|
| 2,813,041 | 11/1957 | Mitchell et al. | 117—21 |
| 3,054,649 | 9/1962 | Arnold et al. | 308—241 |
| 3,207,209 | 9/1965 | Hummel | 117—8 |
| 3,211,325 | 10/1965 | Wisnicki | 117—71 |
| 3,244,556 | 4/1966 | Mytych | 117—64 |

FOREIGN PATENTS 876,209    8/1961    Great Britain.

ALFRED L. LEAVITT, *Primary Examiner.*

JOSEPH B. SPENCER, *Examiner.*

A. H. ROSENSTEIN, *Assistant Examiner.*